(12) United States Patent
Hill et al.

(10) Patent No.: US 6,941,558 B2
(45) Date of Patent: Sep. 6, 2005

(54) SYSTEM AND METHOD FOR AUTOMATICALLY GENERATING AN OBJECT-ORIENTED CLASS WRAPPER

(75) Inventors: Russell Keith Hill, Fort Collins, CO (US); Susan Germaine Wolber, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 673 days.

(21) Appl. No.: 09/999,757

(22) Filed: Oct. 31, 2001

(65) Prior Publication Data

US 2003/0084197 A1 May 1, 2003

(51) Int. Cl.[7] .............................................. G06F 13/10
(52) U.S. Cl. ...................................... 719/321; 719/315
(58) Field of Search .......................... 719/315, 321–327

(56) References Cited

U.S. PATENT DOCUMENTS 5,727,212 A * 3/1998 Dinallo ........................ 719/321
6,345,319 B2 * 2/2002 Lin et al. ........................ 710/8
6,671,743 B1 * 12/2003 Verity .......................... 719/321

OTHER PUBLICATIONS

HP SpectralBER. "HP J4221A/J4222A SpectralBER." Dec. 17, 1999.*
Agilent Technologies. "How to use VXI Plug and Play Driver with Agilent VEE, C/C++, Visual Basic, LabVIEW, and LabWindows / CVI". Aug. 9, 2001.*

* cited by examiner

Primary Examiner—Lewis A. Bullock, Jr.

(57) ABSTRACT

A system for automatically generating an object-oriented class wrapper to simplify writing of device enabling programs is disclosed. In a simplified embodiment, a storage device is utilized having plug and play drivers stored therein. Logic configured to encapsulate functions universal to the plug and play drivers and a vi session handle within a base class is also utilized. The system also comprises logic configured to assign a name for the object-oriented class wrapper; logic configured to enable use of functions defined by the plug and play drivers; logic configured to enable use of parameters associated with the functions defined by the plug and play drivers; and logic configured to limit acceptable values for the parameters in accordance with acceptable parameter values defined by the plug and play drivers.

20 Claims, 5 Drawing Sheets

SYSTEM AND METHOD FOR AUTOMATICALLY GENERATING AN OBJECT-ORIENTED CLASS WRAPPER

FIELD OF THE INVENTION

The present invention generally relates to communication with devices and, more particularly, is related to simplifying the creation of programs to communicate with devices through use of object-oriented class wrappers.

BACKGROUND OF THE INVENTION

Improvements in computer architecture have enabled a single computer to communicate with a large number of devices that are connected to the computer. To allow proper communication with each individual device, each device is typically provided with a driver. Drivers provide a means of communication between a computer and a device utilized by the computer, allowing access to functionality made available by the device.

A driver is required for each individual device to enable communication between the computer and the device. If each driver is written in a different manner, called by the computer in a different manner, and/or is executed differently, software programmers that utilize the drivers to enable access to functionality made available by the device would find it difficult to write device interactive software. Therefore, it is desirable to have a standard available to dictate a required manner of creating each driver thereby making the job of software programmers less difficult.

The VXIplug&play Systems Alliance was created on Sep. 22, 1993 to endorse and implement common standards and practices in both hardware and software. These common standards are utilized to assist device and software programmers and/or vendors in creating drivers to effectively communicate with devices and software. The alliance encourages the use of standard frameworks in the programming of device drivers, thereby enabling a variety of drivers from multiple manufactures and vendors to operate cooperatively within the same computer system. In addition, the use of the standard framework in the creation of drivers allows software developers and vendors to create programs that communicate with devices in a standard manner, thereby simplifying the creation of device-enabling programs.

VXIplug&play drivers make it easier for a programmer to communicate with different devices from different manufactures in a standard manner. It should be noted that while the present disclosure is provided with reference to VXIplug&play drivers, other plug and play drivers having similar characteristics such as, but not limited to, IVI-C drivers, may be replaced.

The use of a standard manner of communication necessitates programmer knowledge of one set of functions for programming devices that utilize VXIplug&play drivers. As an example, if a programmer intends to set a device to a known state, a specific function is called (i.e., reset). This function is the same function called by all devices that utilize VXIplug&play drivers regardless of the type of device utilized. Therefore, when setting any device that utilizes a VXIplug&play driver to a known state it is necessary to utilize and have knowledge of a single function. Alternatively, if there were no standard to utilize in programming device drivers, it would be necessary for a programmer to possess knowledge of each different function, for each different device, that may be used to set a device to a known state.

While the combination of efforts by the VXIplug&play Systems Alliance and the use of VXIplug&play drivers alleviates a certain amount of difficulty in creating programs that allow access to functionality made available by devices, there still is an amount of tediousness incorporated into device-enabling program creation. The following provides three examples of problems and/or limitations associated with the use of VXIplug&play drivers. It should be noted that these are not the only limitations associated with the use of VXIplug&play drivers, but instead, are merely used as examples.

First, VXIplug&play drivers comprise multiple functions that may be called during the creation of device-enabling programs by utilizing developing environments such as Microsoft Visual Basic. Unfortunately, functions made available by device drivers are presented to the programmer in a list that is not conveniently sorted. While the source of stored device drivers may be determined by use of a vendor unique identifier associated with defined functions of the device driver, the number of functions and constants defined by the device driver is still quite immense. Therefore, there is still a great amount of difficulty and/or tediousness involved in creating device-enabling programs since searches are required to find appropriate driver defined functions that may be used to call specific device functionality. This difficulty is amplified when more than one device is utilized, so that one program uses multiple devices.

Second, during the creation of device enabling programs, a handle is utilized to associate a device with a called function defined by the device driver. Specifically, when a programmer is encoding a device-enabling program, the programmer is required to manually identify the device associated with the function they wish to call during execution of the program. This process is tedious and requires searching to identify the handle used by the device for which they are providing programming. In addition, for each function that is called, the handle is specified to ensure that the proper device performs the defined functions.

Third, VXIplug&play drivers handle error reporting via the return of a value corresponding to error conditions that are defined by the programmer. Specifically, in creating device-enabling programs, the programmer is required to identify each possible error that may be encountered when calling functions of the device driver. In addition, the programmer is required to identify a path of resolution to be performed in response to encountering the defined error. As with identification of handles, identification of each error and resulting measures to be taken, is a tedious process.

SUMMARY OF THE INVENTION

In light of the foregoing, the preferred embodiment of the present invention generally relates to a system for providing an object-oriented class wrapper to simplify the creation of programs that allow access to functions and parameters made available by device drivers.

Generally, with reference to the structure of the object-oriented system, the system utilizes a storage device having plug and play drivers stored therein and a memory. The system also comprises logic configured to encapsulate functions universal to the plug and play drivers and a vi session handle within a base class; logic configured to assign a name for the object-oriented class wrapper; logic configured to enable use of functions defined by the plug and play drivers; logic configured to enable use of parameters associated with the functions defined by the plug and play drivers; and logic configured to limit acceptable values for the parameters in accordance with acceptable parameter values defined by the plug and play drivers.

The present invention can also be viewed as providing a method of automatically generating an object-oriented class wrapper for simplifying writing of device enabling programs. In this regard, the method can be broadly summarized by the following steps: storing plug and play drivers within a storage device; encapsulating functions universal to the plug and play drivers and a vi session handle within a base class; assigning a name for the object-oriented class wrapper; enabling use of functions defined by the plug and play drivers; enabling use of parameters associated with the functions defined by the plug and play drivers; and limiting acceptable values for the parameters in accordance with acceptable parameter values defined by the plug and play drivers.

Other systems and methods of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components of the drawings are not necessarily to scale, emphasis instead being placed upon clearly illustrating the principles of the present invention. Moreover, in the drawings, like referenced numerals designate corresponding parts throughout the several views.

DETAILED DESCRIPTION OF THE PREFERRED EMBODIMENT

The wrapper generation system of the present invention can be implemented in software, firmware, hardware, or a combination thereof. In the preferred embodiment of the invention, which is intended to be a non-limiting example, a portion of the system is implemented in software that is executed by a computer, for example, but not limited to, a server, a personal computer, work station, minicomputer, or main frame computer.

The software based portion of the wrapper generation system, which comprises an ordered listing of executable instructions for implementing logical functions, can be embodied in any computer-readable medium for use by, or in connection with, an instruction execution system, apparatus, or device such as a computer-based system processor containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus or device.

The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

Figure 1:
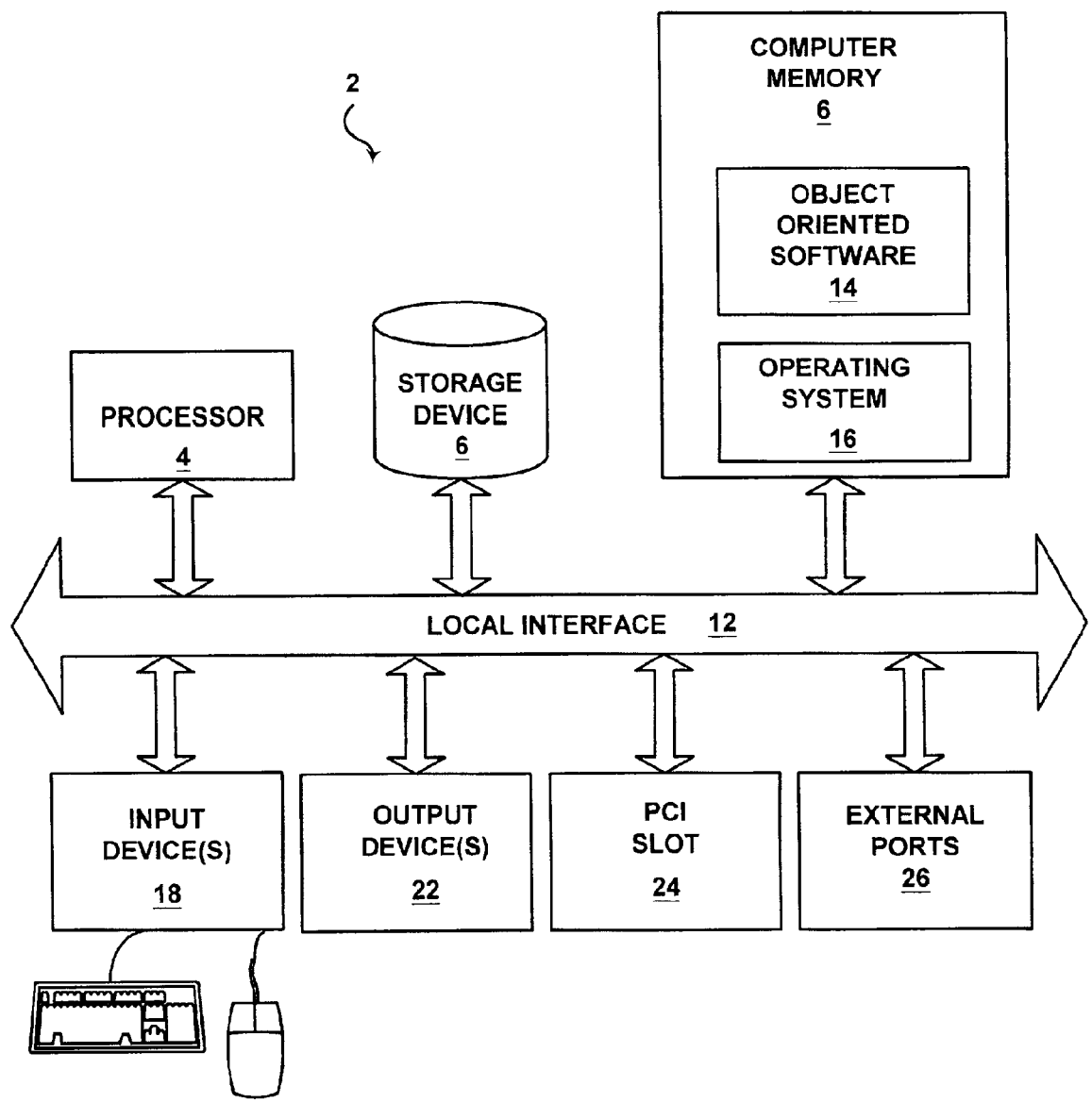
FIG. 1 is a block diagram illustrating a typical computer or processor based system in which the present wrapper generation system may be provided.

Referring now to the drawings, wherein like reference numerals designate corresponding parts throughout the drawings, FIG. 1 is a block diagram illustrating a typical computer or processor based system 2 in which the present wrapper generation system may be provided. As is illustrated by FIG. 1, the computer system 2 comprises a processor 4, a storage device 6, and a computer memory 8. The processor 4 accepts data and/or commands from the computer memory 8 over a local interface 12, such as a bus(es), or a dedicated path. The local interface 12, located in the computer system 2 may be, for example, a peripheral computer interface (PCI) bus.

The computer memory 8 has software 14 stored therein, wherein the software 14 defines functions to be performed by the processor 4 in accordance with the present wrapper generation system. The computer memory 8 may also comprise an operating system 16 stored therein. Generally, the computer system 2 may run any of a number of different platforms and operating systems, including, but not limited to, the Unix®, WindowsNT®, SunSolaris® or any such operating system.

The computer system 2 further comprises input device(s) 18 and output device(s) 22. Examples of input devices 18 may include, but are not limited to a scanner, a keyboard, or a local access network connection. Examples of output devices 22 may include, but are not limited to, a video display, a printer, or a printer port. Further, at least one PCI slot 24 may be attached to the local interface 12 and provides a means for a peripheral device, such as a network interface card (NIC), to attach to the computer system 2. In addition, a number of external ports 26, such as, but not limited to, a serial port, a parallel port, or a universal serial bus port may be located within the computer system for allowing various devices to be connected to the computer system 2. Other external ports 26, or interfaces, may be located between the computer system 2 and devices connected thereto including, but not limited to, an IEEE 1394 (firewire), a general purpose interface bus (GPIB), or a custom personal computer plug in (PCPI) card.

Device drivers may be stored within a storage device 6 located within the computer system 2, wherein the device drivers enable communication between the computer system 2 and devices connected to the computer system 2. Specifically, each device connected to the computer system 2 comprises at least one device driver that is stored within the storage device 6, which is accessible by the object-oriented software 14 stored within the computer memory 8. Further description of the object-oriented software 14 and functions provided by the software 14 is provided herein below. It should be noted that the functions provided by the software may instead be provided via hardware by logical devices.

Figure 2:
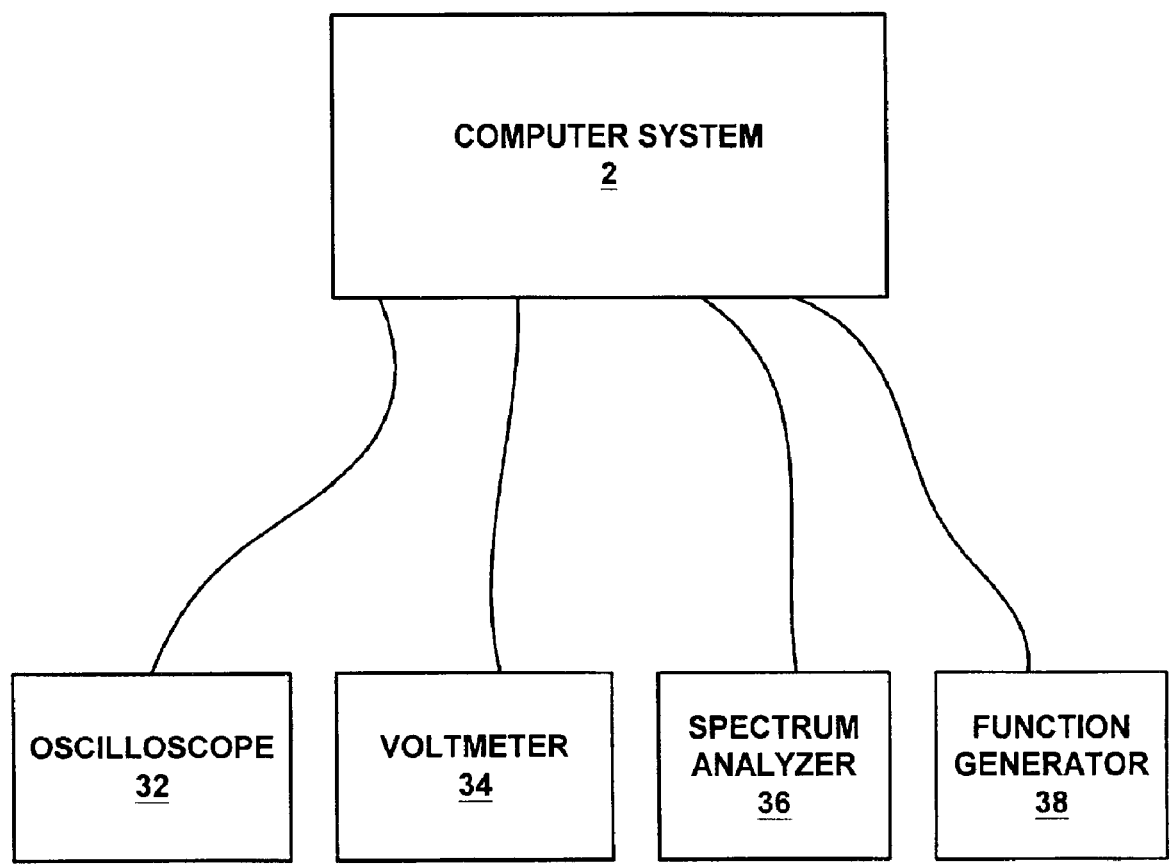
FIG. 2 is a block diagram providing examples of devices that may be connected to external ports of the computer system of FIG. 1.

FIG. 2 is a block diagram providing examples of devices that may be connected to external ports 26 of the computer system 2. It should be noted that the devices illustrated by FIG. 2 are provided merely as examples since other devices may be connected to the external ports 26. In addition, it should be noted that the devices may not actually be physically connected to the external ports 26, but instead, may communicate with the computer system 2 via an alternative communication means, such as, but not limited to, a wireless propagation medium or infrared.

As is shown by FIG. 2, the computer system 2 may communicate with an oscilloscope 32, a voltmeter 34, a spectrum analyzer 36, and/or a function generator 38. While FIG. 2 shows connection of the devices 32, 34, 36, 38 to the computer system 2 via external ports 26, it should be noted that the devices 32, 34, 36, 38 may instead communicate with the computer system 2 via a wireless propagation medium.

The wrapper generation system creates an object-oriented wrapper that interacts with device drivers loaded within the storage device 6 (FIG. 1). Interaction between the wrapper and the device drivers creates a simple and efficient environment for writing a device-enabling program. Creation of the wrapper and interaction between the wrapper and the device drivers is described in detail below. In addition, after description of wrapper creation and interaction between the wrapper and the device driver, an example of programmer interaction with the wrapper is provided during writing of a device-enabling program.

Figure 3:
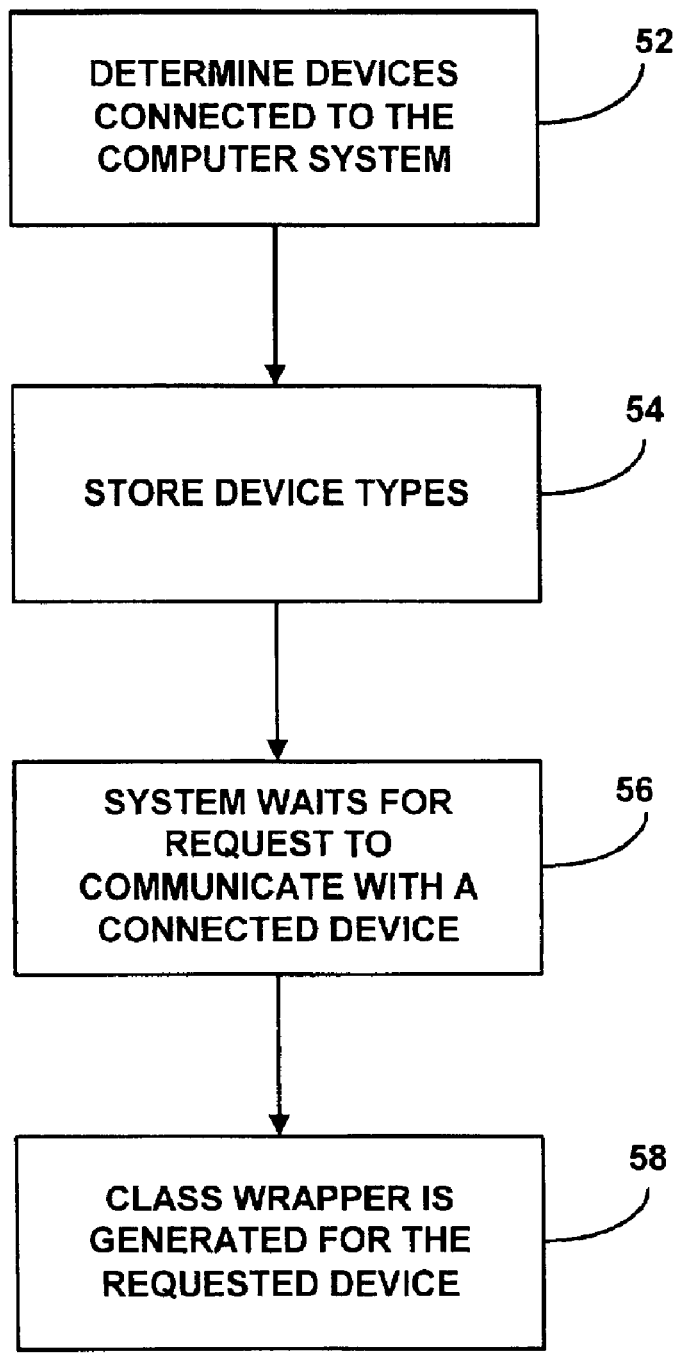
FIG. 3 is a flow chart that shows the architecture, functionality, and operation of a possible method of using the wrapper generation system of FIG. 1.

FIG. 3 is a flow chart that shows the architecture, functionality, and operation of a possible method of using the present wrapper generation system. In this regard, each block represents a module, segment, or portion of code, which comprises one or more executable instructions for implementing the specified logical function(s). It should also be noted that in some alternative implementations, the functions noted in the blocks may not occur, or occur out of the order noted. For example, two blocks shown in succession may in fact be executed substantially concurrently or the blocks may sometimes be executed in the reverse order, depending upon the functionality involved, as will be further clarified hereinbelow.

The wrapper generation system first determines what devices are connected to the computer system 2 (block 52). Different methods may be utilized to determine connected devices 32, 34, 36, 38, an example of which is transmitting a ping from the computer system 2 to external ports 26. The ping is then forwarded to connected devices 32, 34, 36, 38. When the ping is received by the connected devices 32, 34, 36, 38, the devices transmit a return message to the computer system 2, wherein the return message identifies the device type and the external port 26 of the computer system 2 to which each device 32, 34, 36, 38 is connected. The device types are then stored by the computer system 2 for use by a programmer during writing of a device-enabling program (block 54). Storage of the device types may be performed by numerous methods depending upon a desired method of presentation of the device types to a programmer utilizing the present wrapper generation system. As an example, the device types may be stored within the computer memory 8 or the storage device 6.

After the device type is stored within the computer system 2, the wrapper generation system awaits a programmer-provided request for communication with a connected device (block 56). The programmer initiates the communication request during writing of a device-enabling program, wherein the programmer may either select the name of a connected device 32, 34, 36, 38 from a list provided by the wrapper generation system, or may type the name of the device 32, 34, 36, 38. Of course other methods of selection of a connected device may be utilized as well.

Figure 4:
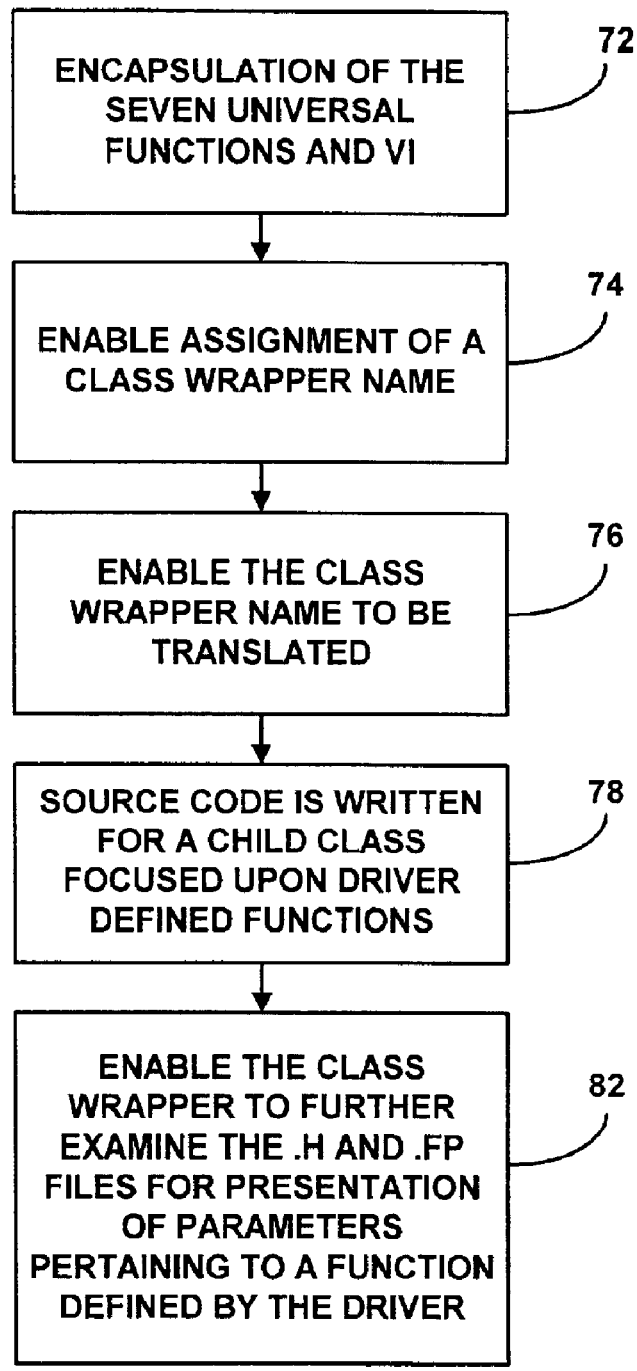
FIG. 4 is a flow chart that further illustrates operation of a possible method of creating the object-oriented wrapper of FIG. 3.

When the wrapper generation system receives a communication request from the programmer, a class wrapper is generated for the requested device (block 58). Wrapper generation is further described with reference to the flow chart of FIG. 4 provided below. Execution of the class wrapper generation system generates a base class, if the base class does not already exist, and a child class, as described below. The base and child classes contain a number of methods (described below in FIG. 4) which call the original VXIplug&play driver functions, wherein the methods are utilized by the programmer in writing the device-enabling program. Once the class wrapper is generated, the wrapper generation system allows the programmer to write the device-enabling program via use of features made available by the class wrapper, each of which is described in detail below.

FIG. 4 is a flow chart that further illustrates operation of a possible method of creating the class wrapper of FIG. 3. As is known in the art, a VXIplug&play driver comprises a number of functional files. While there are multiple files defined by the driver, two of these files that have particular importance with reference to the class wrapper are the header file, having the extension ".h", and the front panel file, having the extension ".fp". The header file provides information regarding the device driver and the device to which it pertains. This information includes functions and parameters of the driver. The front panel file defines a number of user-friendly graphical interfaces that may be presented to a programmer during use of a corresponding driver. The graphical interfaces are used to present the functions and parameters to a programmer in a user friendly manner via use of items such as, but not limited to, drop-down boxes and scrolling fields. As an example, if a programmer is writing source code for a device-enabling program wherein the device is an oscilloscope, the .fp file may provide properties for a graphical user interface that presents the user with selection options for parameters of the oscilloscope. Options may include voltage levels or wave types, to mention a few, that are placed in a drop-down menu for selection.

As is known to those skilled in the art, other files are associated with a VXIplug&play driver. Certain of these files may be utilized by the present wrapper generation system in addition, or in replacement of, the .h and .fp files described above. As an example, the generated wrapper child class, which is described in detail below, may call the original VXIplug&play driver functions via use of the .dll file from the VXIplug&play driver. As mentioned within the background of the invention, while the present disclosure is provided with reference to VXIplug&play drivers, other plug and play drivers having similar characteristics such as, but not limited to, IVI-C drivers, may be supplemented.

It should be noted that the class wrapper described herein may be written in one of many different software languages and may be utilized by a device-enabling program written in any software language. As is known in the art, there are seven different functions that are universally used by VXIplug&play drivers. These seven functions are defined by the VXIplug&play standard endorsed and implemented by the VXIplug&play Systems Alliance. The seven functions include the "init," "close," "reset," "self_test," "revision_query," "error_query," and "error_message," all of which are well know by those of ordinary skill in the art. In addition, VXIplug&play drivers also universally utilize a "vi" session handle. As is known by those of ordinary skill in the art, the vi session handle is utilized for identifying a specified device. Since the above seven functions are known by those skilled in the art, they are not described in detail herein, specifically since their definitions are not needed for the present wrapper generation system. Instead, the use of the remainder of the functions in the VXIplug&play drivers is what is more important to the wrapper generation system.

For creation of the object-oriented class wrapper, the seven functions and the vi session handle are "encapsulated" (block 72) since the VXIplug&play drivers are capable of utilizing these features. Encapsulation of the seven functions and the vi session handle is performed by writing source code that generates code which identifies the seven functions, enables use and interaction with the seven functions, and determines and stores the vi session handle for use by the programmer of a device-enabling program. The generated code that encapsulates the seven functions and the vi session handle is referred to as a base class. The definition of the base class correlates to the basic meaning of a class with reference to object-oriented code. Specifically, as is known by those of ordinary skill in the art, a class is an object describing a grouping of data items that are conceptually related and thought of as modeling an object. A class wrapper is later created which inherits from (re-uses) source code written for the base class, as is further explained below.

Generally, source code is written to inspect the .fp and .h files and to generate the class wrapper depending upon the information retrieved from the .fp and .h files, as is further explained below. To generate the class wrapper, source code is written that enables assignment of a name for the class wrapper (block 74). The name is assigned for the class wrapper by inspecting the .fp and .h files, from which a device driver name is obtained. As is known in the art, the fp and .h files for a VXIplug&play driver have a corresponding driver name. The driver name is also referred to as the vendor/model number prefix for the driver, which typically begins with two letters that refer to the maker of the device, and ends with numbers that describe the instrument for which the driver works.

In assigning a name to the class wrapper, a determination is made as to whether both the .fp and .h driver names, for a device selected by the programmer, are identical. If the .fp file name and the .h file name are not identical, then the driver to which the .fp and .h files pertain is not a legitimate VXIplug&play driver and the file name may not be used as the name for the class wrapper. An error may then by returned to the writer of the device-enabling program to specify that a legitimate driver for the selected device does not exist. However, if the .fp file name and the .h file name are identical, the class wrapper name is set as the driver name. As is known by those of ordinary skill in the art, there are other methods that may be utilized for determining if the driver is a legitimate VXIplug&play driver. Therefore, the present description is not intended to limit the use of other methods for determining legitimacy of drivers.

Source code is then added to enable the class wrapper to translate alpha characters in the class wrapper name so that the class wrapper name is in upper case letters and numbers (block 76). This translation simplifies interaction of the class wrapper with multiple software programs that recommend capital letters for interaction, such as, but not limited to, the Microsoft .NET Framework. Therefore, while translation is not required, it is desirable.

Once the class wrapper name and base class are known, source code is written to generate a child class, focused upon driver defined functions, wherein the child class is derived from, and reuses, functionality from the base class (block 78). The child class comprises the functionality defined within the base class plus driver defined functions beyond those defined by the base class, wherein the additional functions are defined by the driver associated with the .fp and .h files. A first step in generating child class source code is to create members within the child class. Members of the child class comprise, but are not limited to, constructors and methods. Therefore, source code is written to generate constructors and methods within the child class. It should be noted that, while the present wrapper generation system generates a base class and a child class, multiple base classes, or no base classes may be generated for the class wrapper. It should also be known that, since the base class comprises functions universal to all VXIplug&play drivers, the base class may be utilized for multiple child classes.

In accordance with the preferred embodiment of the invention, the wrapper generation system provides one base class per computer system 2. The wrapper generation system generates this base class if it does not already exist; alternately the base class could be provided (pre-written) as part of the wrapper generation system. The wrapper generation system also generates a single child class for each VXIplug&play driver, where the generated child class inherits from, and re-uses, the base class, with the child class name being as described above as the class wrapper name. As is known by those of ordinary skill in the art, in object-oriented systems, inheritance is the preferred method of code re-use. The present inheritance design allows the programmer that may be using multiple devices, in this case multiple generated child classes, to call any of the seven functions in the base class on any instance (described below) of any child class.

As is known in the art, a constructor allows creation of an instance. Constructors are treated as instructions to create a new instance where key values for the instance do not yet exist. In fact, the key values are provided by the methods, as is discussed below. The methods provide functionality to make driver functions available to be called by the writer of the device-enabling program. Therefore, the methods identify driver functions that will interact and define a created instance. After the constructor allows creation of the instance created by the programmer during the writing of the device-enabling program, the methods allow the programmer to call functions defined by the device driver for which the child class has been generated.

In accordance with the preferred embodiment of the invention, the methods are generated into the child class for each VXIplug&play driver function. To generate a method, source code is provided in the wrapper generation system to remove the vendor name/model prefix from each of the functions provided by the device driver. The prefix is removed since it is no longer needed, due to prior use in naming the class wrapper. In addition, the prefix is removed to make the function names easier to read by the programmer during writing of the device-enabling program that utilizes the class wrapper. By removing the prefix, the programmer is able to view a function name without a prefix, and since the class wrapper sorts functions according to device drivers, the removal enables the programmer to call and/or view known driver functions without using prefixes.

In addition, in accordance with the preferred embodiment of the invention, the function names may be further translated to conform with recommended naming conventions of the Microsoft .NET Framework. Conforming includes removing underscores and using Pascal Casing conventions, where the first letter of each word in the function name is capitalized. For example, "self_test" is translated to "SelfTest."

After removal of the driver function prefix and any translation, the portion of the function name that remains is compared to other values stored and referenced by the base and child classes to ensure that there are no conflicting names used by the base or child classes. The comparison process checks each of the previously identified functions and the class wrapper name. Therefore, after comparison, each function within the child class is unique.

If there is a conflict wherein more than one function has the same name, one of the functions, or methods, is modified so that each function within the child class is unique. An example of a process that may be used to modify a function name is appending a suffix to the driver function name until the function name does not conflict with any function names in the base or child classes. It should be noted that at this point, the functions defined in the base and child classes include the functions defined by the device driver. It should also be noted that other processes may be utilized to modify the function name to ensure uniqueness.

Parameters defined by the device driver for each function are also inspected, amended, and correlated to their respective driver function within the base class. Amending of parameter types and names is performed in accordance with the program being utilized to write the present source code, which will create the class wrapper base and child classes.

As is known by those of ordinary skill in the art, driver parameter types are provided in a format that is in accordance with the VXIplug&play driver standard. Unfortunately, this standard format may not be usable in the software language in which the base and child classes of the class wrapper are generated, or in the language used by the programmer to call the generated wrapper. Therefore, the parameter types are amended so that they are congruent with the software language in which the base and child classes of the class wrapper will be generated, and also congruent with the most common languages used by programmers. Amending may be performed by defining functionality that translates the type of a parameter into a type that may be recognized by the software language of the base and child classes of the class wrapper. As an example, if a VXIplug&play driver defined a parameter type as "ViInt32," the parameter type may be translated to "int" since "int" is recognized by the software language of the base and child classes of the wrapper.

In accordance with the preferred embodiment of the invention, the parameter names are also translated to conform to the recommended naming conventions of the Microsoft .NET Framework. Conforming includes removing underscores and using Camel Casing conventions, where the first letter of each word except the first word is capitalized. For example "volts_DC" is translated to "voltsDc".

As is shown by block 82, source code is added to the wrapper generation system so that the class wrapper generator further examines the .h file and the .fp file for presentation of parameters pertaining to a function defined by the driver. The .fp file specifies whether parameter values are integers or enumerations. An enumeration, as is known by those of ordinary skill in the art, represents when there is a specific defined number of values. Therefore, when parameter values are provided as an enumeration there are a specific number of acceptable defined values for the function. Alternatively, when parameter values are provided as an integer there is no limitation to the number of acceptable values for the parameter, or at least, acceptable values fall into a very large group.

On execution of the wrapper generation system, the .h file and the .fp file is examined for each parameter defined by the driver. Examination of the .h file and the .fp file is performed by first examining the .h file of the driver to determine if acceptable values for a parameter may be provided as an integer or as an enumeration. Afterwards, the .fp file is examined to determine if only specific values for the parameter are acceptable. Therefore, it should be noted that the .fp file may further define whether the acceptable values for the parameter may be an integer or an enumeration. As an example, for a specific function, examination of the .h file may illustrate that any integer value between −2147483648 and +2147483647 may be utilized as the value for a parameter. However, the .fp file may provide only ten (10) values that are acceptable as parameter values.

If it is determined that a parameter has a specific number of allowed values, the enumerated values of the parameter are incorporated into the class wrapper. Incorporation of the parameter values into the class wrapper ensures that, after creation of the class wrapper, only allowed parameter values are provided to the programmer during writing of a device-enabling program. Otherwise, the programmer would be resorted to continuously entering different values for a parameter until he/she enters a value that is accepted based upon the driver to whom the parameter pertains, or the programmer is forced to manually consult a driver help file to determine the possible values for each parameter. Since the .fp file provides user friendly graphical interfaces, use of the class wrapper provides the acceptable parameter values to the programmer of a device-enabling program in an easy-to-use pull-down screen, thereby removing the element of guessing which values are acceptable for a parameter.

Other properties are also defined by the .fp file, including, but not limited to, help text that provides a definition and description of each function and parameter provided by the device driver. To utilize the help property of the .fp file, source code may be generated into the child and base classes defining functionality so that when the class wrapper is created, the class wrapper correlates each function with its corresponding help text.

Preferably, in accordance with the preferred embodiment of the invention, the source code generated for each function in the child and base classes actually comprises two functions for each function of the VXIplug&play driver. The two functions within the child and base classes differ in their error handling strategy. The original VXIplug&play driver handles error reporting via the return of a value corresponding to error conditions encountered. Therefore, it is necessary for the programmer to write code to check the return value of each function called, and identify a path of resolution to be performed in response to encountering each defined error.

Having two functions in the generated class wrapper allows the programmer of a device-enabling program to choose an error handling strategy. The first function of the two functions, referred to as the raw function, simply acts similarly to the original VXIplug&play driver function and returns an error status. As mentioned above, the programmer writes code to handle the defined error.

The second function of the two functions uses a more modern error handling strategy known as Structured Exception Handling, which is well known to those of ordinary skill in the art. With use of Structured Exception Handling, occurring errors trigger an Exception. For the programmer using the wrapper, this is much simpler to use in that there is no return value to check on every function call, multiple function calls to the wrapper can be grouped into one try/catch block, and errors are checked for only once. It should be noted that the Exception error handling strategy is supported by most modern programming languages.

The following provides an example of use of the wrapper generation system and interaction with a programmer of a device-enabling program, from the perspective of the programmer. The programmer first selects a device for which the device-enabling program will apply. Since the device names have been previously stored, selection may be performed via use of a pull-down screen or simply by typing the device name if known. After selection of a device, the class wrapper is generated.

The wrapper generation system returns sample source code to the programmer that shows an example of how to instantiate (call the constructor) of the driver wrapper, and call one or more functions in the wrapper. The sample source code also includes a handle for the device selected. This sample source code may be incorporated into the user's program, if the programmer so desires.

When the programmer is returned the sample source code he/she is capable of selecting additional driver functions to be inserted into the device-enabling program. To select functions of the driver, the programmer types the handle for the device and the "." dot character. As is known by those of ordinary skill in the art, in various versions of Microsoft Visual Studio (including .NET), which is the preferred software program utilized for writing device-enabling programs, the "." dot character is a special character that signals the Microsoft Visual Studio editor to use IntelliSense. Therefore, once the programmer types a "." dot character, functions defined by the driver of the selected device are provided to the programmer for selection. These functions do not comprise prefixes and have been previously translated to ensure that they are recognizable by the software program used to write the device-enabling program. It should be noted that if the programmer is not using a software program that recognizes the "." dot character (a program without IntelliSense), an option for a drop-down menu comprising the functions, may be provided to the programmer upon selection of the program feature.

Figure 5:
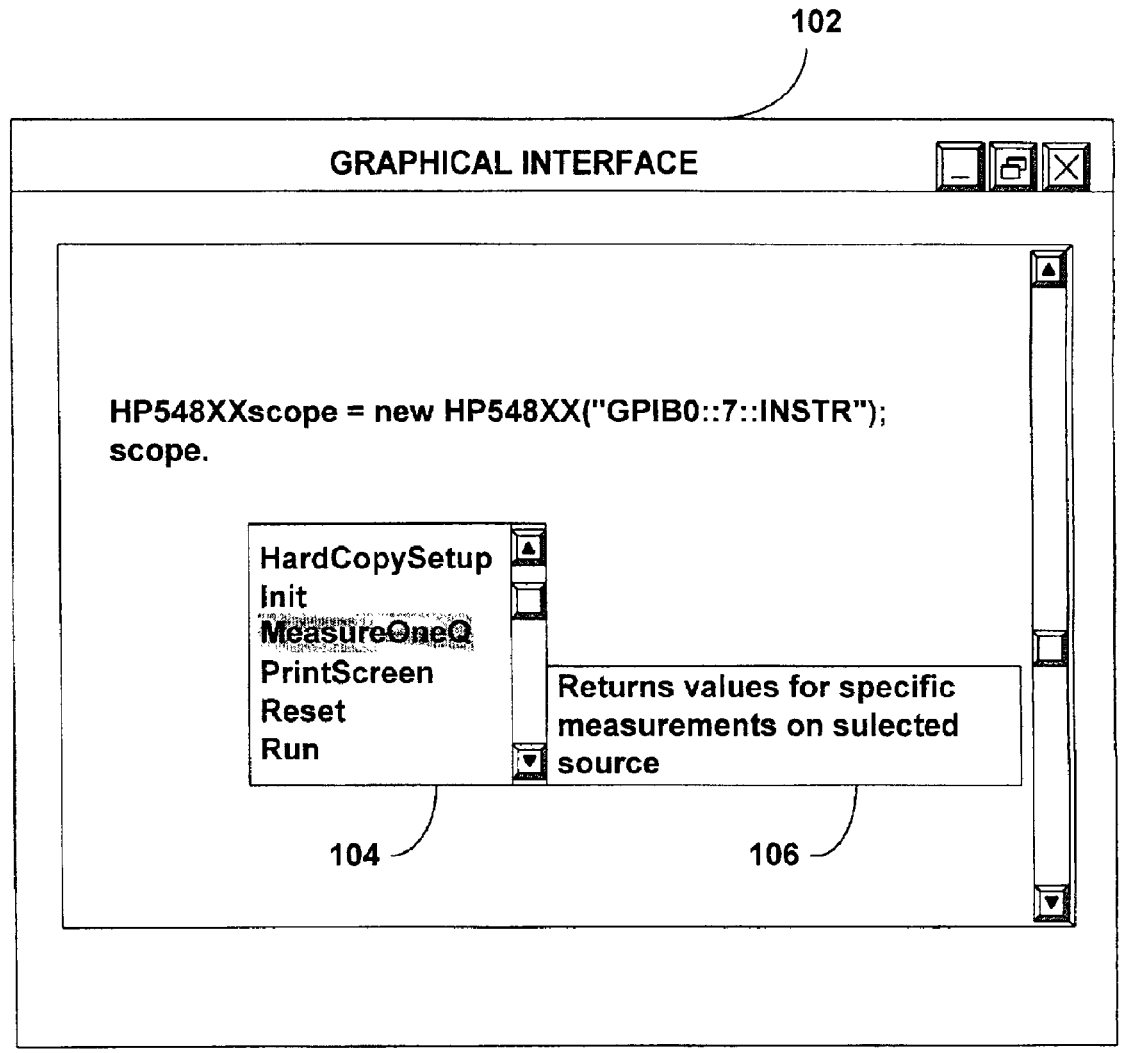
FIG. 5 is an example of a provided graphical interface utilized for writing a device-enabling program.

Preferably, the functions are provided in a drop-down menu. Highlighting of any particular function changes text within a window that provides help information regarding the function, its parameter names and types, and its use. After selection of a function, related parameters may also be selected by a drop-down menu that is presented to the programmer, wherein the parameters have previously been checked to ensure that they pertain to the selected device. An example of a provided graphical interface utilized for writing the device-enabling program is provided by FIG. 5. FIG. 5 illustrates a graphical interface 102, wherein a drop-down menu 104 is opened after the programmer types a "." dot character. In addition, a help window 106 is provided for the highlighted function "MeasureOneQ."

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

We claim:

1. A system for automatically generating an object-oriented class wrapper for plug and play drivers, comprising:
   a memory; and,
   a processor programmed by software stored within said memory to perform the steps of:
      generating an object-oriented class wrapper responsive to header and front panel files associated with a plug and play compliant device driver;
      encapsulating functions universal to said plug and play drivers and a vi session handle within a base class responsive to an alphanumeric identifier of a target device associated with the device driver, wherein the alphanumeric identifier is checked for conflicts with base class system objects;
      assigning a name for said object-oriented class wrapper responsive to the alphanumeric identifier, wherein assigning comprises appending a suffix when a conflict exists;
      enabling use of functions defined by said plug and play drivers; and
      enabling use of parameters associated with said functions defined by said plug and play drivers.

2. The system of claim 1, wherein said object-oriented class wrapper is created in response to a request from a programmer to communicate with a device connected to said system.

3. The system of claim 2, wherein said step of enabling use of said functions generates source code for a first generated function and a second generated function, wherein said first generated function provides error reporting via return of a value previously defined by said programmer, and wherein said second generated function provides error reporting via triggering Structured Exception Handling.

4. The system of claim 1, wherein said plug and play drivers are VXIplug&play drivers.

5. The system of claim 1, wherein said object-oriented class wrapper is generated from said base class and a child class, said child class comprising said encapsulated functions in addition to functions defined by a single one of said plug and play drivers, and parameters associated with said single one of said plug and play drivers, wherein a single child class is developed for each said plug and play driver.

6. The system of claim 5, wherein each of said encapsulated functions, said functions defined by a single one of said plug and play drivers, and said parameters associated with said single one of said plug and play drivers comprises a unique name.

7. The system of claim 1, wherein said step of assigning a name for said object-oriented class wrapper is performed by utilizing a driver name provided by a .fp driver file and a .h driver file.

8. The system of claim 1, further comprising the step of providing a graphical interface for selection of said functions and said parameters, wherein said graphical interface is defined by said plug and play drivers.

9. The system of claim 8, wherein said graphical interface also provides help information associated with said functions and said parameters.

10. A system for automatically generating an object-oriented class wrapper for plug and play drivers, comprising:

a memory comprising:

logic configured to encapsulate functions universal to said plug and play drivers and a vi session handle within a base class;

logic configured to assign a name for said object-oriented class wrapper;

logic configured to enable use of functions defined by said plug and play drivers by examining and converting plug and play data types to a common language runtime data type; and logic configured to enable use of parameters associated with said functions defined by said plug and play drivers.

11. The system of claim 10, wherein said object-oriented class wrapper is generated from said base class and a child class, said child class comprising said encapsulated functions in addition to functions defined by a single one of said plug and play drivers, and parameters associated with said single one of said plug and play drivers, wherein a single child class is developed for each said plug and play driver.

12. The system of claim 11, wherein each of said encapsulated functions, said functions defined by a single one of said plug and play drivers, and said parameters associated with said single one of said plug and play drivers comprises a unique name.

13. The system of claim 10, wherein said assigning a name for said object-oriented class wrapper is performed by utilizing a driver name provided by a .fp driver file and a .h driver file.

14. The system of claim 10, further comprising logic to provide a graphical interface for selection of said functions and said parameters, wherein said graphical interface is defined by said plug and play drivers.

15. A method of automatically generating an computer-implemented object-oriented class wrapper for plug and play drivers, comprising the steps of:

encapsulating functions universal to said plug and play drivers and a vi session handle within a base class;

assigning a name for said object-oriented class wrapper responsive to an alphanumeric identifier, wherein assigning comprises appending a suffix when a conflict exists;

enabling use of functions defined by said plug and play drivers by examining and converting plug and play data types to a common language runtime data type; and enabling use of parameters associated with said functions defined by said plug and play drivers.

16. The method of claim 15, wherein said object-oriented class wrapper is generated from said base class and a child class, said child class comprising said encapsulated functions in addition to functions defined by a single one of said plug and play drivers, and parameters associated with said single one of said plug and play drivers, wherein a single child class is developed for each said plug and play driver.

17. The method of claim 16, wherein each of said encapsulated functions, said functions defined by a single one of said plug and play drivers, and said parameters associated with said single one of said plug and play drivers comprises a unique name.

18. The method of claim 15, wherein said step of enabling use of said functions generates source code for a first generated function and a second generated function, wherein said first generated function provides error reporting via return of a previously defined value, and wherein said second generated function provides error reporting via triggering Structured Exception Handling.

19. A system for automatically generating an object-oriented class wrapper, comprising:

means for encapsulating functions universal to plug and play drivers stored within said system and a vi session handle within a base class;

means for assigning a name for said object-oriented class wrapper;

means for enabling use of functions defined by said plug and play drivers by examining and converting plug and play data types to a common language runtime data type; and means for enabling use of parameters associated with said functions defined by said plug and play drivers.

20. The system of claim 19, wherein said object-oriented class wrapper is generated from said base class and a child class, said child class comprising said encapsulated functions in addition to functions defined by a single one of said plug and play drivers, and parameters associated with said single one of said plug and play drivers, wherein a single child class is developed for each said plug and play driver.

* * * * *

UNITED STATES PATENT AND TRADEMARK OFFICE
CERTIFICATE OF CORRECTION

PATENT NO. : 6,941,558 B2
DATED : September 6, 2005
INVENTOR(S) : Hill et al.

It is certified that error appears in the above-identified patent and that said Letters Patent is hereby corrected as shown below:

Column 13,
Lines 41-42, delete "A method of automatically generating an computer-implemented" and insert -- A computer-implemented method of automatically generating an --.

Signed and Sealed this

Twenty-seventh Day of December, 2005

JON W. DUDAS
*Director of the United States Patent and Trademark Office*